(12) United States Patent
Kim et al.

(10) Patent No.: US 6,512,753 B1
(45) Date of Patent: Jan. 28, 2003

(54) DEVICE AND METHOD FOR SPREADING CHANNELS IN MOBILE COMMUNICATION SYSTEM

(75) Inventors: Jae-Yoel Kim, Kyonggi-do (KR); Jae-Min Ahn, Seoul (KR); Hoe-Won Kang, Seoul (KR); Seung-Joo Maeng, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/473,766

(22) Filed: Dec. 29, 1999

(30) Foreign Application Priority Data

Dec. 29, 1998  (KR) .............................. 98-63929

(51) Int. Cl.$^7$ .............................................. H04B 7/216
(52) U.S. Cl. ...................... 370/335; 370/208; 370/328; 370/342; 370/441
(58) Field of Search ................................ 370/203, 208, 370/209, 328, 329, 335, 342, 441; 375/130, 140, 146; 327/164

(56) References Cited

U.S. PATENT DOCUMENTS 6,041,034 A * 3/2000 Fukumasa et al. .......... 370/203
6,314,125 B1 * 11/2001 Shanbhag .................... 375/130
6,317,413 B1 * 11/2001 Honkasalo .................... 370/209
6,332,006 B1 * 12/2001 Rydbeck et al. ............. 375/262
6,377,539 B1 * 4/2002 Kang et al. ................... 370/209

* cited by examiner

Primary Examiner—Nay Maung
Assistant Examiner—Gregory V. Old
(74) Attorney, Agent, or Firm—Dilworth & Barrese, LLP (57) ABSTRACT

Disclosed is a channel spreading device for a base station device in a CMDA communication system for spreading input symbols using a first quasi-orthogonal code having a first length or channel spreading the input symbols using a second quasi-orthogonal code having a second length which is a multiple of the first length. The device comprises a spreading code generator for generating the second quasi-orthogonal code; a channel spreader for providing a plurality of durations by dividing a duration of the second quasi-orthogonal code by said multiple of the length of the first quasi-orthogonal code, and spreading channel coded symbols with the quasi-orthogonal codes divided to have a length corresponding to the divided durations so as to spread the symbols identical in number to said multiple of the first quasi-orthogonal code duration at the duration of the second quasi-orthogonal; and a PN spreader for spreading the channel spread signal with a PN code.

8 Claims, 7 Drawing Sheets

DEVICE AND METHOD FOR SPREADING CHANNELS IN MOBILE COMMUNICATION SYSTEM

BACKGROUND OF THE INVENTION

1. Field of the Invention

The present invention relates generally to a device and method for spreading channels in a CDMA communication system, and in particular to a channel communication device and method for a CDMA communication system having different spreading rates.

2. Description of the Related Art

In order to increase channel capacity, a CDMA (Code Division Multiple Access) communication system spreads channels using orthogonal codes. For example, a forward link of an IMT-2000 system performs channel spreading using orthogonal codes. An example of an orthogonal code that is typically used is a Walsh code.

The number of available orthogonal codes is determined depending upon a modulation method and a minimum data rate. However, in the proposed IMT-2000 CDMA system, the channels assigned to the users will increase in number in order to improve system performance. To this end, the future CDMA system includes a plurality of common channels and dedicated channels and assians the channels to the mobile stations, thereby increasing channel capacity.

However, even in the proposed IMT-2000 CDMA system, an increase in the utilization of the channels limits the number of available orthogonal codes. Further, the reduced number of available Walsh orthogonal codes limits the increase in channel capacity. In an effort to solve this problem, there is proposed a method for using quasi-orthogonal codes for channel spreading codes which have a minimum interference with the orthogonal codes and have a variable data rate.

Figure 1A:
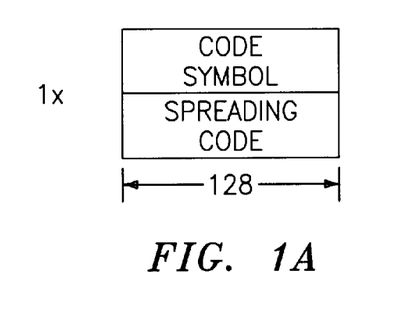
FIGS. 1A and 1B are diagrams for explaining the relationship between 1x and 3x mobile communication systems with respect to code symbols and spreading codes.
Figure 1B:
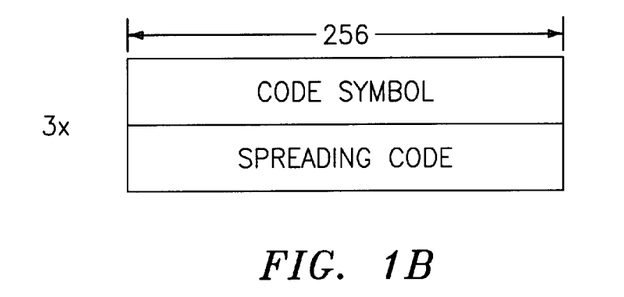

In the IMT-2000 system, a 1× system uses a spreading code group having a spreading code rate 1, and a 3× system uses a spreading code group having a spreading code rate 3. In this case, the 1× system has spreading codes with a maximum length of 128 as shown in FIG. 1A, and spreads code symbols by selecting a spreading code corresponding to a designated spread code index. Further, the 3× system includes spreading codes with a maximum length of 256 as shown in FIG. 1B, and spreads the code symbols by selecting a spreading code corresponding to a designated spreading code index.

Figure 2:
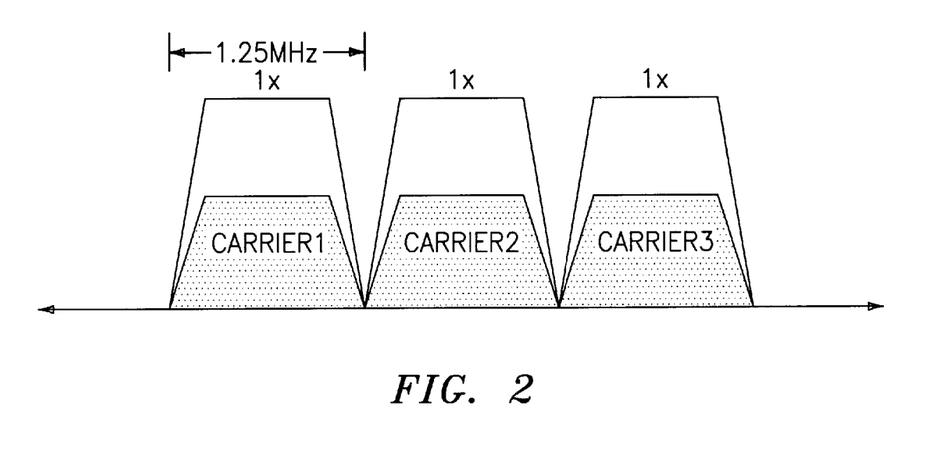
FIG. 2 is a diagram for explaining the channel band relationship between the 1x and 3x mobile communication systems.

Referring now to FIG. 2, there is shown the channel characteristics at a frequency band of a multi-carrier mobile communication system. The 1× system uses a single carrier whose channel band is 1.25 MHz, and the 3× system uses 3 carriers, each distributed to a different channel band and having a combined channel band of 3.75 MHz. A unique orthogonal code is assigned to each carrier. When the 1× system is overlaid with the 3× system as shown in FIG. 2, It is not possible to guarantee a correlation property between a spreading code of length 128 using a mask function at a spreading rate 1 and a spreading code of length 128 using a mask function at a spreading rate 3, at each 1.25 MHz band. Therefore, interference may increase between a user using the masking function at the spreading rate 1× and another user using the mask function at the spreading rate 3×.

Figure 3:
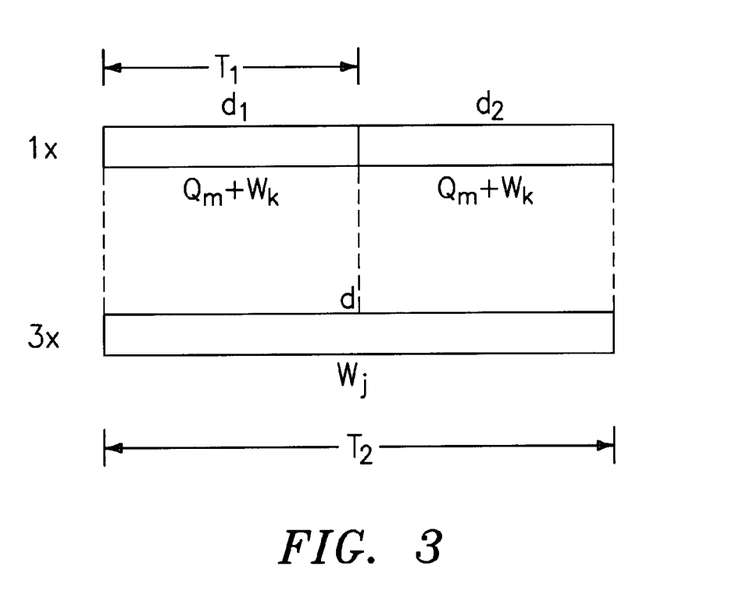
FIG. 3 is a diagram for explaining mutual interference between a channel using a quasi-orthogonal code and a channel using an orthogonal code, the codes having different lengths, in a mobile communication system.

A problem concerning the correlation property will be described with reference to FIG. 3. FIG. 3 is a diagram for explaining the mutual interference between a user of the 1× system using a quasi-orthogonal code and a user of the 3× system using an orthogonal code.

In FIG. 3, $T_1$ denotes the number of chips into which the quasi-orthogonal code user of the 1× system spreads one symbol and $T_2$ denotes the number of chips into which the orthogonal code user of the 3× system spreads one symbol. Interference that the quasi-orthogonal code $(Q_m + W_k)$ user of the 1× system, experiences from the orthogonal code $(W_j)$ user of the 3× system can be given by the equation:

$$\sum_{i}^{T_1} (Q_{m,i} + W_{k,i}) + W_{j,i} = \qquad (1)$$

$$\sum_{i}^{T_1} Q_{m,i} + (W_{k,i} + W_{j,i}) = \sum_{i}^{T_1} Q_{m,i} + W_{s,i} < \Theta_{min}$$

That is, the interference satisfies an upper limit formula of the correlation for the quasi-orthogonal code. Therefore, in this case, there is no serious matter.

Figure 4:
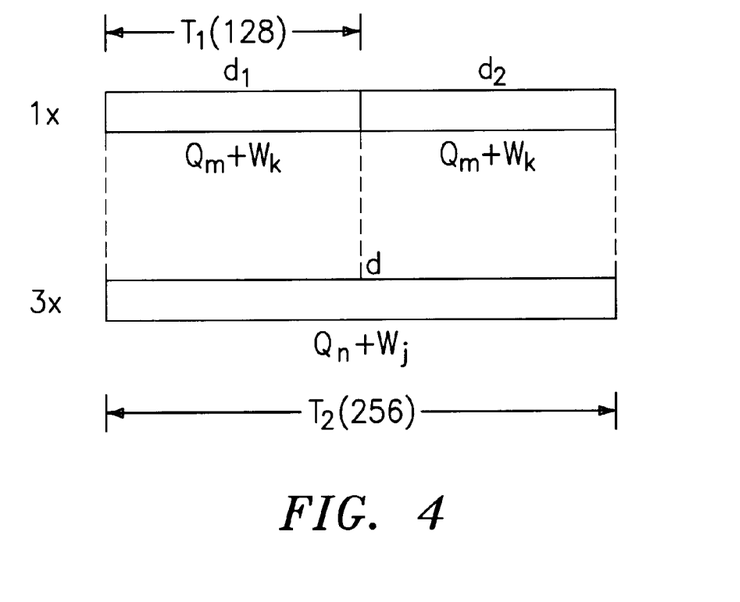
FIG. 4 is a diagram for explaining mutual interference between channels using quasi-orthogonal codes of different lengths in a mobile communication system.

FIG. 4 is a digram for explaining mutual interference between channels each using quasi-orthogonal codes of different lengths. In FIG. 4, 1× denotes a user using a quasi-orthogonal code of length 128 and 3× denotes a user using a quasi-orthogonal code of length 256. In this case, interference that the quasi-orthogonal code $(Q_m + W_k)$ user of the 1× system experiences from the quasi-orthogonal code $(Q_n + W_j)$ user of the 3× system does not satisfy the upper limit formula, as shown in Equation (2) below:

$$\sum_{i}^{T_1} (Q_{m,i} + W_{k,i}) + (Q_{n,i} + W_{j,i}) = \qquad (2)$$

$$\sum_{i}^{T_1} (Q_{m,i} + Q_{n,i}) + (W_{k,i} + W_{s,i}) = \sum_{i}^{T_1} (Q_{m,i} + Q_{n,i}) + W_{s,i}$$

In this case, the mutual interference between the channels increases.

Therefore, when using the quasi-orthogonal codes of spreading code groups having different lengths, the mobile communication system stores the spreading codes of different lengths, and thus increases the hardware complexity. Further, using the spreading codes having different spreading rates deteriorates the interference property between two users thereby causing performance degradation.

SUMMARY OF THE INVENTION

It is, therefore, an object of the present invention to provide a communication device and method for a CDMA communication system wherein a base station device spreads and despreads channel signals using spreading codes having the same length as those of mobile stations having different spreading rates.

It is another object of the present invention to provide a communication device and method for a CDMA communication system wherein a mobile station spreads and despreads channel signals using spreading codes having the same length as those of base stations having different spreading rates.

To achieve the above objects, there is provided a channel spreading device for a base station device in a CDMA communication system for spreading input symbols using a first quasi-orthogonal code having a first length or channel spreading the input symbols using a second quasi-orthogonal code having a second length which is a multiple of the first length. The device comprises a spreading code generator for generating the second quasi-orthogonal code; a channel spreader for providing a plurality of durations by dividing a duration of the second quasi-orthogonal code by the multiple of the length of the first quasi-orthogonal code, and spreading channel coded symbols with the quasi-orthogonal codes having the plurality of durations described above; and a PN spreader for spreading the channel spread signal with a PN code.

The spreading code generator comprises a controller for generating a mask index and a Walsh code index corresponding to a received index for generating the second quasi-orthogonal code; a mask generator for generating a mask of the second quasi-orthogonal code corresponding to the mask index; a Walsh code generator for generating a Walsh code corresponding to the Walsh code index; and a circuit for mixing the mask of the second quasi-orthogonal code with the Walsh code to generate the second quasi-orthogonal code to use as the spreading code.

When the length of the second quasi-orthogonal code is 2 times the length of the first quasi-orthogonal code, the channel spreader spreads, at a spreading rate of the first quasi-orthogonal code, one symbol with a first half-period chip signal of the second quasi-orthogonal code output from the spreading code generator and another symbol with a second half-period chip signal of the second quasi-orthogonal code, whereby two symbols are spread at a duration of one spreading code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description well-known functions of constructions are not described in detail since they would obscure the invention in unnecessary detail.

In the following description, the term "orthogonal spreading" will be used interchangeably with the terms "channel spreading", "short code spreading", "spreading" and "PN spreading". Further, the term "spreading codes of the same length" refers to a set of quasi-orthogonal codes having the same length. In addition, the term "spreading code" refers to a Walsh orthogonal code or quasi-orthogonal code.

Although an exemplary embodiment of the present invention will be described with reference to a spreading and despreading operation of an IMT-2000 base station and mobile station in which a 1x system and a 3x system use the same spreading codes, it is also possible to apply the invention to the systems using different data rates. That is, the embodiment of the present invention will be described with reference to the case where a base station spreads channel signals using spreading codes of the same length and transmits the spread channel signals to mobile stations having different spreading rates, and the mobile stations then despread the transmitted spread channel signals. Alternatively, the invention can be equally applied to the case where a mobile station spreads channel signals using spreading codes of the same length and transmits the spread channel signals to base stations having different spreading rates, and the base stations then despread the transmitted spread channel signals.

In the embodiment, the 1x system and the 3x system share the spreading codes. It is possible to reduce the hardware complexity by allowing several Nx systems to share quasi-orthogonal sequences of the longest length. In addition, when the several Nx systems are used and each system uses spreading codes of the same length, it is possible to reduce interference between the users at the 1x1.25 MHz band.

Figure 5:
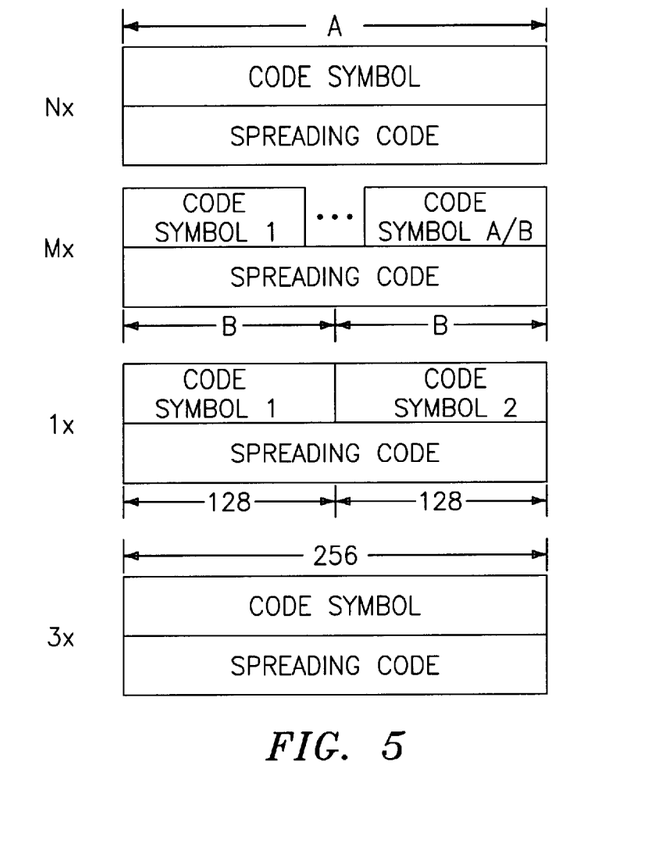
FIG. 5 is a diagram for explaining a method for channel spreading symbols of different lengths using spreading codes of the same length according to an embodiment of the present invention, in a mobile communication system.

Referring to FIG. 5, there is shown a diagram for explaining an operation of channel spreading symbols of different lengths using the spreading codes of the same length according to an embodiment of the present invention. FIG. 5 shows a method for using the spreading codes, when an Nx system using spreading codes of length A and a Mx system using spreading codes of length B (where A>B) share the spreading codes of length A. More specifically, FIG. 5 shows a case where a 1x system using spreading codes of maximum length 128 and a 3x system using spreading codes of maximum length of 256 share the spreading codes of length 256, by way of example. In this manner, it is possible to solve the problems that occur when using the spreading codes in the prior art.

Figure 6:
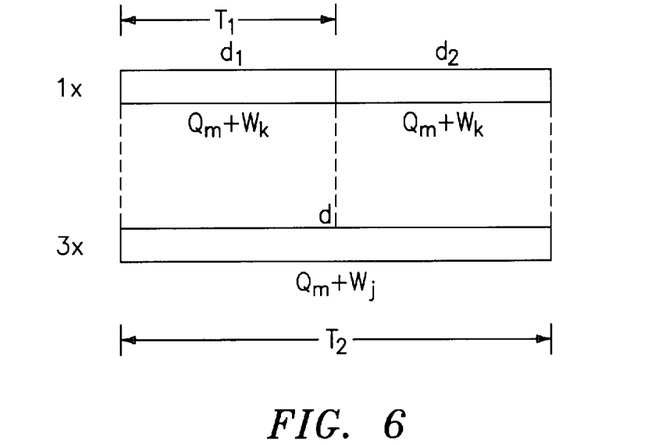
FIG. 6 is a diagram for explaining mutual interference between channels when symbols of different lengths are channel spread using quasi-orthogonal codes of the same length in a mobile communication system.

FIG. 6 is a diagram for explaining the mutual interference between the 1x system using the quasi-orthogonal codes and the 3x system using the quasi-orthogonal codes. In FIG. 6, $T_1$ denotes the number of chips into which the quasi-orthogonal code user of the 1x system spreads one symbol, and $T_2$ denotes the number of chips into which the quasi-orthogonal code user of the 3x system spreads one symbol.

Referring to FIG. 6, interference that the quasi-orthogonal code $(Q_m+W_k)$ user of the 1x system experiences from the quasi-orthogonal code $(Q_m+W_j)$ user of the 3× system can be given by the equation:

$$\sum_{i}^{T_L}(Q_{m,i}+W_{k,i})+(Q_{m,i}+W_{j,i})= \tag{3}$$

$$\sum_{i}^{T_L}(Q_{m,i}+Q_{m,i})+(W_{k,i}+W_{s,i})=\sum_{i}^{T_L}W_{s,i}=0$$

That is, since the interference is 0, there is no interference. Therefore, it is possible to solve the interference problem of the prior art.

Therefore, in the embodiment, it is possible to reduce the mutual interference between the users while decreasing the hardware complexity by allowing several Nx systems share the spreading codes. Tables 1 and 2 below show quasi-orthogonal sequences of length 128 for use in the 1× system and quasi-orthogonal sequences of length 256 for use in the 3× system, by way of example. The 1× system and the 3× system can share either masks of length 128 shown in Table 1 or masks of length 256 shown in Table 2.

TABLE 1

| Function | Masking Function (Hex) |
| --- | --- |
| 0 | 00000000000000000000000000000000 |
| 1 | 17dbbd71e8db427117dbbd71e8db4271 |
| 2 | 72824ebebeb17d7272824ebebeb17d72 |
| 3 | 2dee87bb8744d2ee2dee87bb8744d2ee |

TABLE 2

| Function | Masking Function (Hex) |
| --- | --- |
| 0 | 00000000000000000000000000000000 00000000000000000000000000000000 |
| 1 | 77b4b477774bb48887bb447878bbbb78 77b44b88774b4b777844447887744bb78 |
| 2 | 7e4ddbe817244d7ed41871bd428e18d4 d4e77142bd8ee7d47eb2db17e824b27e |
| 3 | 417214d87db1281beb274172d7e47db1 b17de4d78dbed8141b28b17d27eb8dbe |

When the 1× system and 3× system share the spreading codes of length 256, the 3× system, which originally uses the spreading codes of length 256, has the existing structure. Therefore, in the embodiment, a description will be made regarding only the structure of the 1× system when using the spreading codes of length 256, in which a spreading factor is assumed to be 128 which is the highest one in the 1× system.

An Embodiment of Transmitter

In the transmitter described below, it is assumed that the 1× system spreads one symbol into 128 chip length and the 3× system spreads one symbol into 256 chip length. Further, it is assumed that the 1× system and the 3× system share the spreading codes of length 256.

Figure 7:
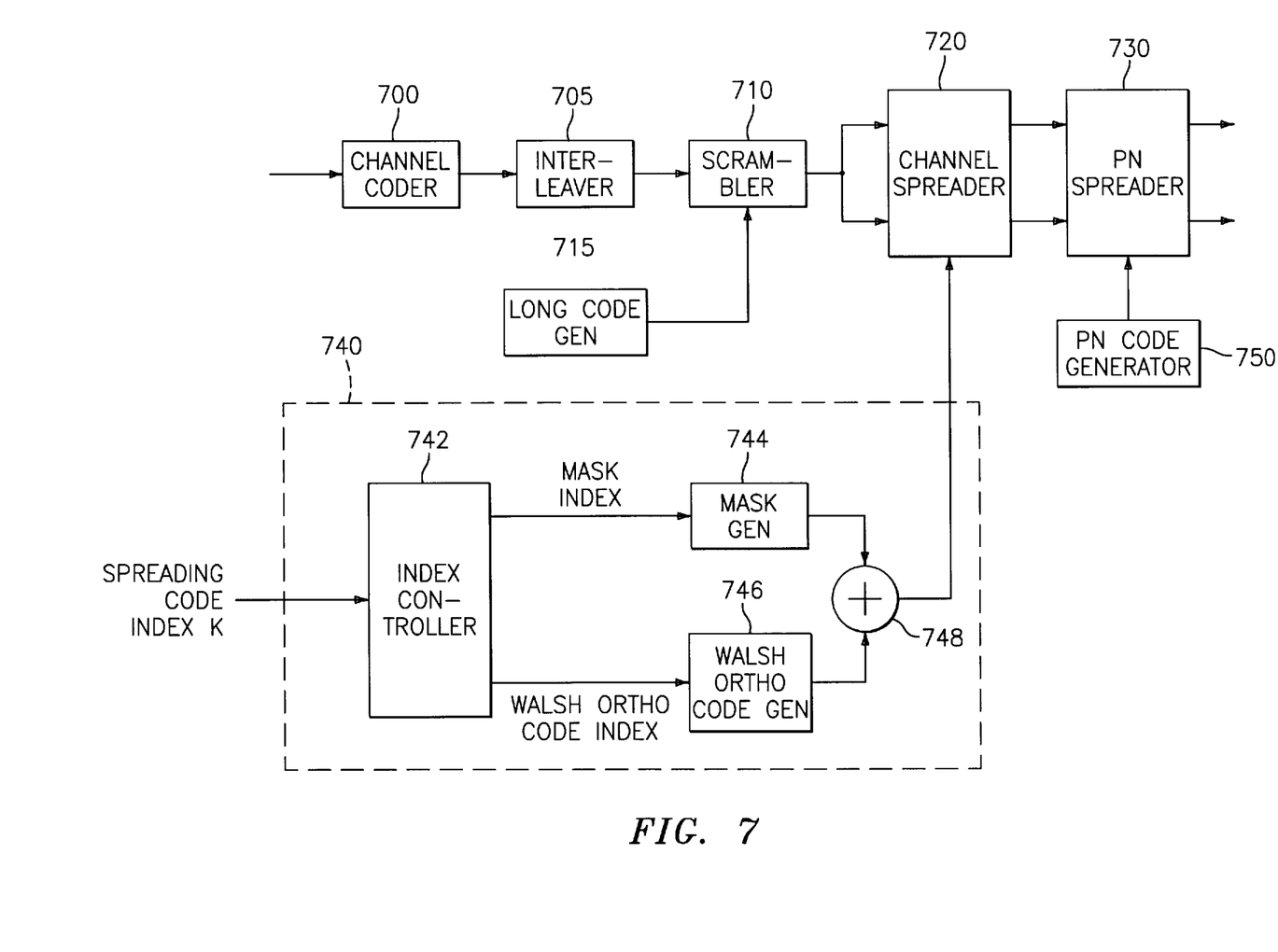
FIG. 7 is a block diagram illustrating a spreading device for a transmitter in a 1x mobile communication system according to an embodiment of the present invention.

Referring now to FIG. 7, there is shown a structure of a 1× system transmitter. A channel coder 700 codes an input signal into symbol data and an interleaver 705 interleaves the coded symbols output from channel coder 700. The coded symbols interleaved by the interleaver 705 are provided to a long code scrambler 710. A long code generator 715 generates a long code for scrambling the interleaved channel signal. Thus, the long code scrambler 710 spreads the interleaved symbols with the long code. An exclusive OR gate is typically used for the long code scrambler 170, and in this case, the long code scrambler 710 exclusively ORs the channel coded signal and the long code to generate scrambled symbols. The scrambled symbols are provided to a channel spreader (or orthogonal modulator) 720 after separation into I-component symbols and Q-component symbols.

At the same time, a spreading code index k indicating a channel assigned to the user is input to a spreading code generator 740. As stated above, a Walsh code or a quasi-orthogonal code is typically used for the spreading code. With regard to operation of the spreading code generator 740, upon receipt of the spreading code index k, an index controller 742 outputs a mask index and a Walsh orthogonal code index corresponding to the received spreading code index k. Here, the mask refers to a mask for a quasi-orthogonal code. Upon receipt of the mask index, a mask generator 744 accesses a mask of length 256 corresponding to the input mask index from a mask table. At the same time, upon receipt of the Walsh orthogonal code index output from the index controller 742, a Walsh orthogonal code generator 746 accesses an Walsh orthogonal code of length 256 corresponding to the received Walsh orthogonal code index from a Walsh orthogonal code table. An adder 748 then adds the quasi-orthogonal code mask of length 256 output from the mask generator 744 and the Walsh orthogonal code of length 256 chips output from the Walsh orthogonal code generator 746, to generate a quasi-orthogonal code. The generated quasi-orthogonal code is used as a spreading code corresponding to the spreading code index k, and this spreading code is provided to the channel spreader 720. Here, when no mask index is provided to the mask generator 744 (i.e., a mask index value=0), the mask generator 744 outputs no quasi-orthogonal code mask. In this case, the spreading code output from the adder 748 becomes the Walsh orthogonal code.

The generated spreading codes of length 256 are input to the channel spreader 720 along with the long code spread symbols (i.e., the symbols scrambled with the long code). At this point, the one symbol is spread with the spreading codes of the specific number of chips ($256/2^n$, $1 \leq n \leq 6$). In the embodiment, n=1. That is, for the 1× system which spreads a symbol into 128 chip length, the 1× system spreads one symbol at the first half 128-chip duration and spreads another symbol at the second half 128-chip duration. Therefore, two symbols are spread at 256-chip duration. Thus, the channel spreader 720 spreads the received symbols with the spreading code output from the spreading code generator 740 at a chip rate of 1.2288 Mcps. The spread signals are provided to a PN spreader 730. A PN code generator 750 generates a PN code and outputs it at the chip rate of 1.2288 Mcps. The PN code output from the PN code generator 750 is provided to the PN spreader 730. The PN spreader 730 then spreads the channel spread chip signals with the PN code on a chip unit basis, to output PN spread signals.

Spreading code generators 840, 842, 844, 940, 140, 142 and 144, which will be described with reference to FIGS. 8 to 10, may have the same structure as the spreading code generator 740 of FIG. 7.

Figure 8:
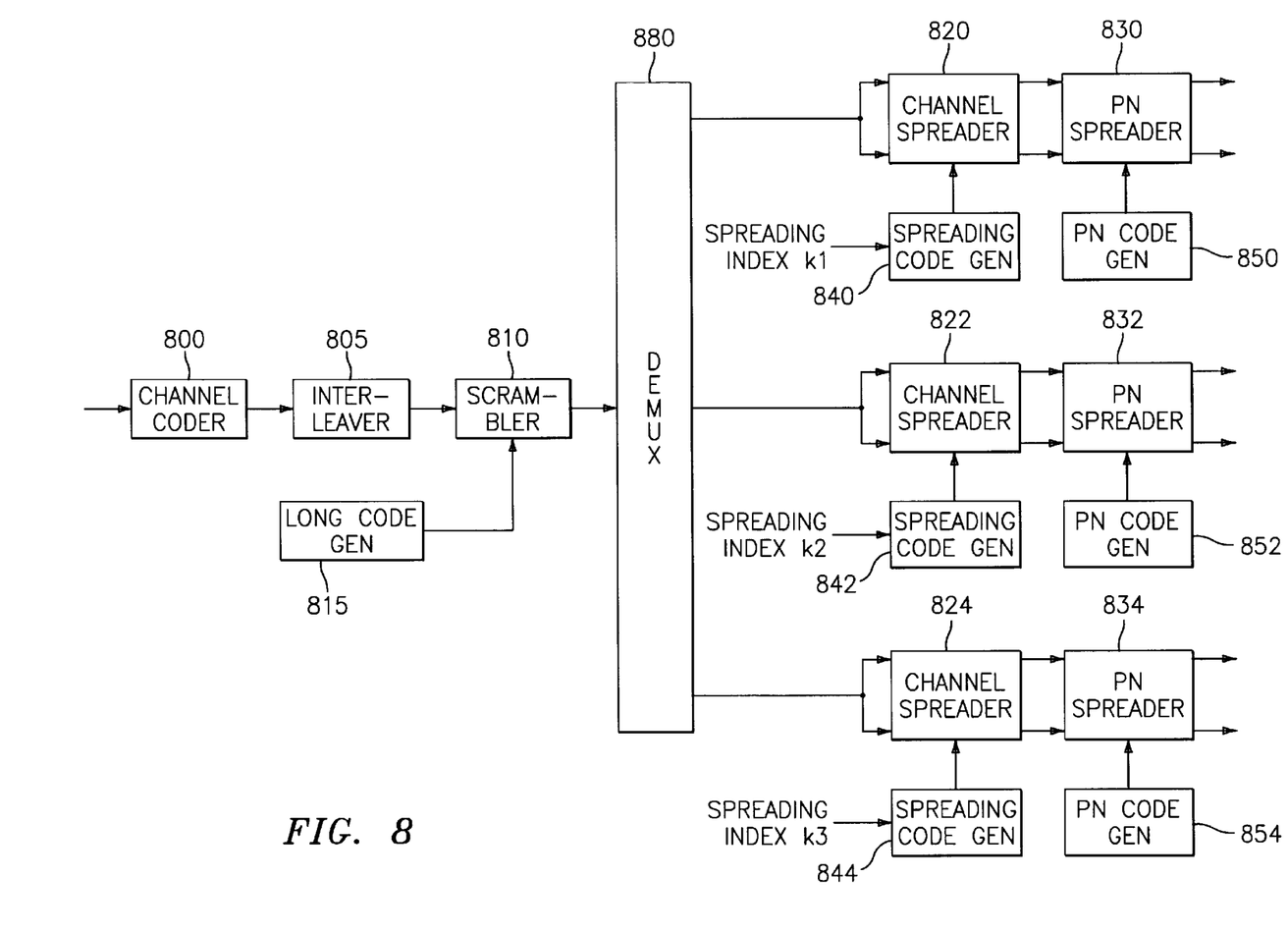
FIG. 8 is a block diagram illustrating a spreading device for a transmitter in a 3x mobile communication system according to an embodiment of the present invention.

Referring now to FIG. 8, there is shown a structure of a multi-carrier 3× system transmitter. Upon receipt of an input signal, a channel code 800 codes the input signal into symbol data, and an interleaver 805 interleaves the coded symbols. The symbols interleaved by the interleaver 805 are provided to a long code scrambler 810, and a long code generator 815 generates a long code for scrambling the symbols. The long code scrambler 810 then spreads the interleaved symbols with the long code to scramble the symbols.

The scrambled symbols are demultiplexed into three groups by a demultiplexer 880 and then provided to channel spreaders 820, 822 and 824 after separation into I components and Q components. Here, the scrambled symbols are demultiplexed into three groups in order to transmit the channel signal using three carriers of the 3× system.

Upon receipt of a spreading code index k1 indicating channel assigned to the user, the spreading code generator 840 generates a spreading code of length 256 corresponding to the received spreading code index k1. Upon receipt of the demultiplexed signals, channel spreader 820 spreads the scrambled symbols with the spreading code. At this point, the channel spreader 820 spreads one symbol with the specific number of chips ($256/2^n$, $0 \leq n \leq 6$) at the chip rate of 1.2288 Mcps. In the embodiment, n=0. Therefore, the channel spreader 820 spreads one symbol at 256-chip duration of the spreading code. The spread signals are provided to a PN spreader 830, and a PN code generator 850 generates a PN code at the chip rate of 1.2288 Mcps. The PN spreader 830 then spreads the channel spread chip signals with the PN code output from the PN code generator 850 on a chip unit basis, to output PN spread signals.

In the same manner, the channel spreaders 822 and 824 spread received symbols with the corresponding spreading codes, and the PN spreaders 832 and 834 spread the received channel spread signals with the PN code. The spreading code generators 840, 842 and 844 generator different spreading codes, whereas the PN code generators 850, 852 and 854 generate the same PN code. Further, the signals output from the PN spreaders 830, 832 and 834 are transmitted on the corresponding carriers after frequency up-conversion.

In FIGS. 7 and 8, the 1× system uses the spreading code of chip length 128 and the 3× system uses the spreading code of chip length 256, as shown in FIG. 4. When the quasi-orthogonal code is used for the spreading code, channel interference may occur between the 1× system and the 3× system. In this case, in the 1× system, the spreading code generator generates the spreading code of 256-chip length, and the channel spreader spreads one symbol with the 128 first half chips and spreads another symbol with the 128 second half chips, as shown in FIG. 5. Therefore, the channel spreader of the 1× system channel separates two symbols at one-spreading code duration. Further, in the 3× system, the spreading code generator also generates the spreading code of 256-chip length and the channel spreader spreads one symbol at 256-chip spreading code duration, as shown in FIG. 5.

Herein, although the 3× system is a multi-carrier system, the invention can be equally applied to the case where the 3× system is a single-carrier system. In this case, the 3× system has the same channel structure as the 1× system and the chip rate becomes 3 times higher.

B. Embodiment of Receiver

Figure 9:
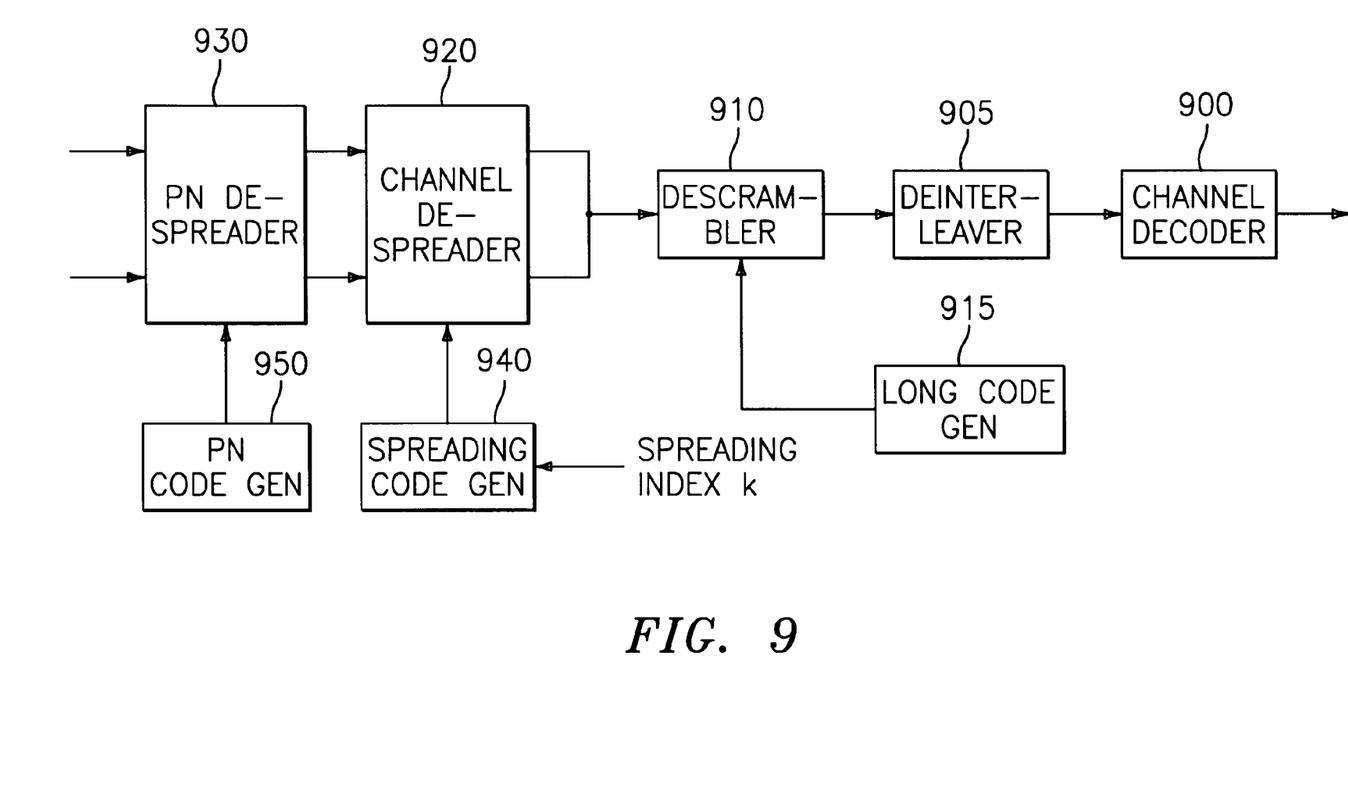
FIG. 9 is a block diagram illustrating a despreading device for a receiver in the 1x mobile communication system according to an embodiment of the present invention.

Referring now to FIG. 9, there is shown a receiver for the 1× system. A PN despreader 930 receives input spread signals and a PN code generator 950 generates a PN code at 1.2288 Mcps. The PN despreader 930 PN despreads the received spread signals with the PN code output from the PN code generator 950 on a chip unit basis. The PN despread signals are provided to a channel despreader 920. At this point, upon receipt of a spreading code index k indicating a channel assigned to the user, a spreading code generator 940 generates a spreading code of maximum length 256 corresponding to the received spreading code index k in the same manner as the spreading code generator 740 of FIG. 7. The channel despreader 920 then despreads the PN despread symbols with the spreading code of the specific number of chips ($256/2^n$, $1 \leq n \leq 6$). That is, when the transmitter for the 1× system of FIG. 7 spreads two symbols at 256-chip duration before transmission, the channel despreader 920 despreads the symbol spread at the first half 128-chip duration and the other symbol spread at the second half 128-chip duration. Upon receipt of the despread signals, a long code descrambler 910 descrambles the despread signals with a long code output from a long code generator 915. The descrambled signals are deinterleaved by a deinterleaved 905 and then decoded by a channel decoder 900.

Figure 10:
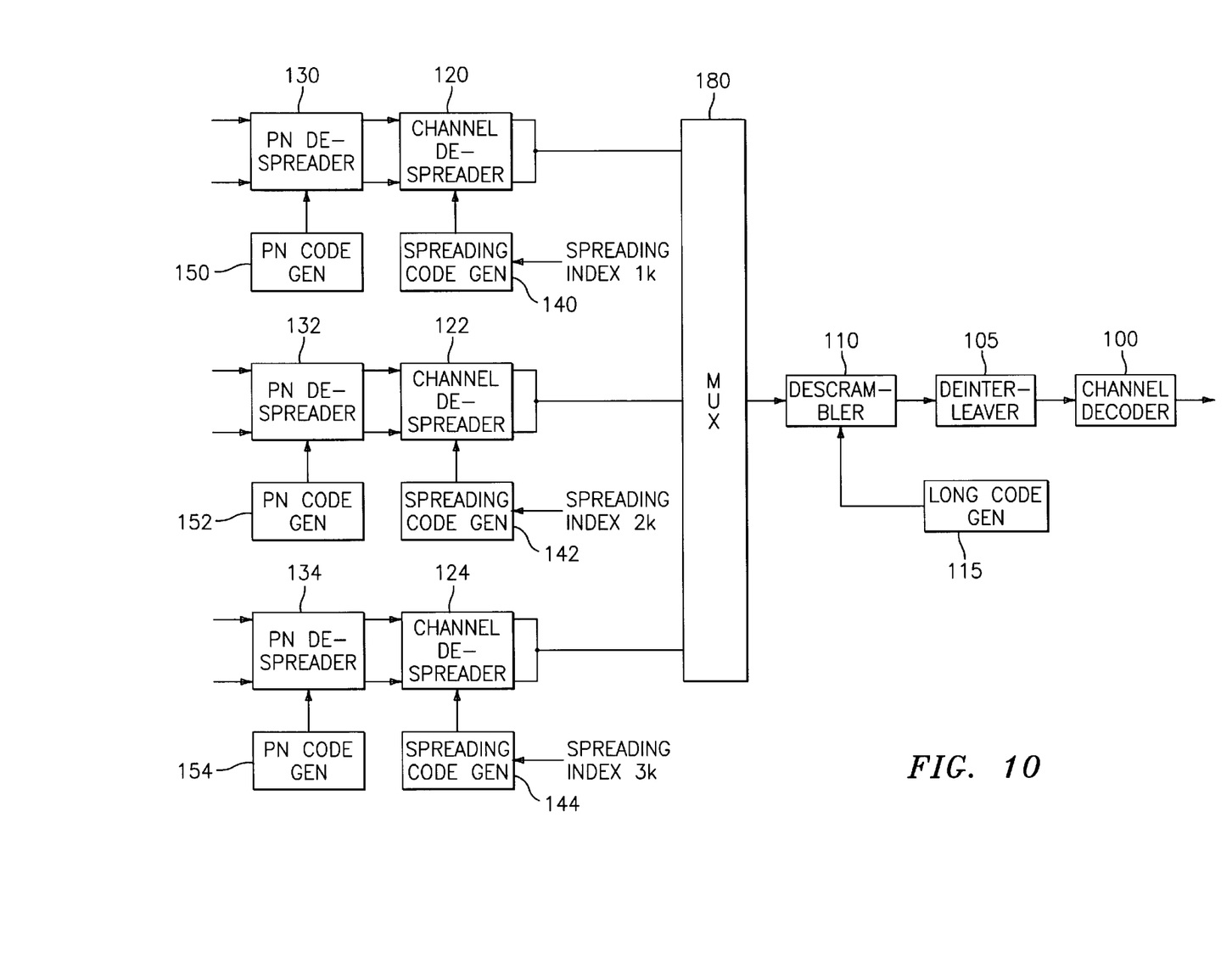
FIG. 10 is a block diagram illustrating a despreading device for a receiver in the 3x mobile communication system according to an embodiment of the present invention.

Referring now to FIG. 10, there is shown the structure of a receiver for the multi-carrier 3× system. A PN despreader 130 receives input spread signals, and a PN code generator 150 generates a PN code at a chip rate of 1.2288 Mcps. The PN despreader 130 then PN despreads the received spread signals with the PN code. The PN despread signals are applied to a channel despreader 120, and a spreading code generator 140 generates a spreading code of maximum length 256 corresponding to a spreading code index k1 indicating a channel assigned to the user. The channel despreader 120 then channel despreads the PN despread signals with the spreading code. At this point, the channel despreader 120 despreads the PN despread symbols with the spreading code of the specific number of chips ($256/2^n$, $0 \leq n \leq 6$), and provides the despread signals to a multiplexer 180 after accumulation. In the 3× system, since n=0, one symbol is despread at 256-chip duration. In the same manner, the signals input to PN despreaders 132 and 134 are also applied to the multiplexer 180 through the same process. The multiplexer 180 then multiplexes the input signals which were despread through 3 different paths, in the reverse order of demultiplexing. Upon receipt of the multiplexed signals, a long code descrambler 110 descrambles the received multiplexed signals with a long code output from a long code generator 115. Thereafter, the descrambled signals are deinterleaved by a deinterleaver 105 and then decoded by a channel decoder 100.

Therefore, in the 1× system, the spreading code generator generates a spreading code of 256-chip length, and the channel despreader despreads one symbol with the 128 first haft chips and spreads another symbol with the 128 second half chips, as shown in FIG. 5. The channel despreader of the 1× system channel thus despreads two symbols during one spreading code duration. Further, in the 3× system, the spreading code generator also generates the spreading code of 256-chip length and the channel despreader despreads one symbol at 256-chip spreading code duration, as shown in FIG. 5.

The novel spreading device for a CDMA communication system enables two users having different spreading rates to use the same spreading code, thereby reducing the hardware complexity. Further, the spreading device can improve the interface property between two users having the different spreading rates, when the two users are overlapped with each other.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel spreading device for a base station device in a CDMA (Code Division Multiple Access) communication system for spreading input symbols using a second quasi-orthogonal code having a length which is a multiple of a first quasi-orthogonal code having a certain length, the device comprising:
   a spreading code generator for generating a second quasi-orthogonal code;
   a channel spreader for providing a plurality of durations by dividing the duration of the second quasi-orthogonal code by said multiple of the length of the first quasi-orthogonal code, and spreading channel coded symbols with the divided second quasi-orthogonal code having said plurality of durations; and
   a PN (Pseudo Noise) spreader for spreading the channel spread signal with a PN code.

2. The channel spreading device as claimed in claim 1, wherein the spreading code generator comprises:
   a controller for generating a mask index and a Walsh code index corresponding to a received spreading code index for generating the second quasi-orthogonal code;
   a mask generator for generating a mask of the second quasi-orthogonal code corresponding to the mask index;
   a Walsh code generator for generating a Walsh code corresponding to the Walsh code index; and
   a circuit element for mixing the mask of the second quasi-orthogonal code with the Walsh code to generate the second quasi-orthogonal code for use as the spreading code.

3. The channel spreading device as claimed in claim 1, wherein when the length of the second quasi-orthogonal code is 2 times the length of the first quasi-orthogonal code, the channel spreader spreads, at a spreading rate of the first quasi-orthogonal code, one symbol with a first half-period chip signal of the second quasi-orthogonal code output from the spreading code generator and another symbol with a second half-period chip signal of the second quasi-orthogonal code, whereby two symbols are spread at a duration of the second quasi-orthogonal spreading code.

4. A channel spreading method for a base station device in a CDMA communication system for spreading input symbols using a second quasi-orthogonal code having a length which is a multiple of a first quasi-orthogonal code having a certain length, the method comprising the steps of:
   generating a second quasi-orthogonal code having a second length which is a multiple of the first quasi-orthogonal code length; and
   providing a plurality of durations by dividing the duration of the second quasi-orthogonal code by said multiple of the length of the first quasi-orthogonal code, and spreading channel coded symbols with the second quasi-orthogonal code having said plurality of durations.

5. The channel spreading method as claimed in claim 4, wherein the spreading code generating step comprises the steps of:
   generating a mask index and a Walsh code index corresponding to a received spreading code index for generating the second quasi-orthogonal code;
   generating a mask of the second quasi-orthogonal code corresponding to the mask index;
   generating a Walsh code corresponding to the Walsh code index; and
   mixing the mask of the second quasi-orthogonal code with the Walsh code to generating the second quasi-orthogonal code for use as the spreading code.

6. The channel spreading method as claimed in claim 4, wherein when the length of the second quasi-orthogonal code is 2 times the length of the first quasi-orthogonal code, the channel spreader spreads, at a spreading rate of the first quasi-orthogonal code, one symbol with a first half-period chip signal of the second quasi-orthogonal code and another symbol with a second half-period chip signal of the second quasi-orthogonal code, whereby two symbols are spread at a duration of one spreading code.

7. A channel despreading device for a mobile station device in a CDMA communication system for despreading input symbols using a second quasi-orthogonal code having a length which is a multiple of a first quasi-orthogonal code having a certain length, the device comprising:
   a PN despreader for mixing a received signal with a PN code to generate PN despread signal;
   a spreading code generator for generating a second quasi-orthogonal code; and
   a channel despreader for providing a plurality of durations by dividing the duration of the second quasi-orthogonal code by said multiple of length of the first quasi-orthogonal code, and despreading channel coded symbols with the divided second quasi-orthogonal code having said plurality of durations.

8. A channel despreading method for a mobile station device in a CDMA communication system for despreading input symbols using a second quasi-orthogonal code having a length which is a multiple of a first quasi-orthogonal code having a certain length, the method comprising the steps of:
   mixing a received signal with a PN code to generate a PN despread signal;
   generating a second quasi-orthogonal code having the second length which is quasi-orthogonal code a multiple of the first length; and
   providing a plurality of durations by dividing the duration of the second quasi-orthogonal code by said multiple of the length of the first quasi-orthogonal code, and despreading channel coded symbols with the divided second quasi-orthogonal code having said plurality of durations.

* * * * *